United States Patent
Todmia et al.

(10) Patent No.: US 12,393,924 B2
(45) Date of Patent: *Aug. 19, 2025

(54) CARD DISPENSER

(71) Applicant: Capital One Services, LLC, McLean, VA (US)

(72) Inventors: Carine Todmia, Upper Marlboro, MD (US); Eric Medin, Chantilly, VA (US); Kelly Jo Brown, Rockville, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,893

(22) Filed: Nov. 14, 2023

(65) Prior Publication Data

US 2024/0078532 A1    Mar. 7, 2024

Related U.S. Application Data

(63) Continuation of application No. 17/234,141, filed on Apr. 19, 2021, now Pat. No. 11,853,996.

(51) Int. Cl.
  *G06Q 20/32* (2012.01)
  *G06Q 20/34* (2012.01)
  *G07F 9/00* (2006.01)

(52) U.S. Cl.
  CPC ..... *G06Q 20/3274* (2013.01); *G06Q 20/3226* (2013.01); *G06Q 20/349* (2013.01); *G06Q 20/355* (2013.01); *G07F 9/001* (2020.05)

(58) Field of Classification Search
  CPC .......... G06Q 20/3274; G06Q 20/3226; G06Q 20/349; G06Q 20/355; G07F 9/001
  See application file for complete search history.

(56) References Cited

U.S. PATENT DOCUMENTS

| | | | | |
|---|---|---|---|---|
| 4,701,600 A | * | 10/1987 | Beech | G07F 7/1008 235/375 |
| 4,825,054 A | * | 4/1989 | Rust | G06Q 20/341 235/487 |
| 4,827,425 A | * | 5/1989 | Linden | G06K 17/00 235/487 |

(Continued)

OTHER PUBLICATIONS

Mastooreh Salajegheh et al., Unleashing the Wild Card for Mobile Payment, May 12, 2014, IEEE, pp. 121-129 (Year: 2014).*

(Continued)

*Primary Examiner* — Nilesh B Khatri
(74) *Attorney, Agent, or Firm* — Foley & Lardner LLP

(57) ABSTRACT

A card dispenser for dispensing a rewritable card is disclosed herein. The card dispenser may include a card feeder for receiving or dispensing a rewritable card. In addition, the card dispenser includes a roller assembly for moving the card from the card feeder to components within the card dispenser; a processor for receiving card data via a short-range wireless connection with a mobile device of a user, the card data including (i) a card identifier of a plurality of card identifiers associated with an account of the user and (ii) a unique derivation key for encrypting the card identifier; and a card writer for powering an electrophoretic display of the card, causing at least a portion of the card data to be rendered on the display, and stopping the powering of the display.

20 Claims, 5 Drawing Sheets

(56) References Cited

U.S. PATENT DOCUMENTS

| | | | | |
|---|---|---|---|---|
| 4,877,946 A * | 10/1989 | Ando | ................ | G06Q 20/3437 |
| | | | | 235/419 |
| 11,861,593 B1 * | 1/2024 | Chin | .................... | G06Q 20/355 |
| 2005/0247797 A1 * | 11/2005 | Ramachandran | .... | G06Q 20/327 |
| | | | | 235/492 |
| 2007/0215699 A1 * | 9/2007 | Arego | ................... | G06Q 30/06 |
| | | | | 235/380 |
| 2013/0191279 A1 * | 7/2013 | Calman | ............... | G06Q 20/354 |
| | | | | 705/41 |
| 2014/0279476 A1 * | 9/2014 | Hua | .................... | G06Q 20/227 |
| | | | | 705/41 |
| 2014/0337175 A1 * | 11/2014 | Katzin | ................ | G06Q 20/326 |
| | | | | 705/26.62 |
| 2014/0368447 A1 * | 12/2014 | Saini | .................... | G06F 3/1423 |
| | | | | 345/173 |
| 2018/0121891 A1 * | 5/2018 | Hosny | ................. | G06Q 20/027 |
| 2019/0354986 A1 * | 11/2019 | Brimhall | ............ | G06Q 20/4018 |
| 2020/0134605 A1 * | 4/2020 | Grant | ................ | G06Q 30/0215 |
| 2020/0250654 A1 * | 8/2020 | Garrett | ................ | G06Q 20/353 |

OTHER PUBLICATIONS

Applications of Electro-Optic Displays, Aug. 27, 2014, IP.com Prior Art Database, pp. 1-15 (Year: 2014).*

* cited by examiner

CARD DISPENSER

CROSS-REFERENCE TO RELATED APPLICATION(S)

This application is a continuation of U.S. patent application Ser. No. 17/234,141, filed Apr. 19, 2021. The content of the foregoing application is incorporated herein in its entirety by reference.

BACKGROUND

Card systems have been used in many industries. For example, the hotel industry uses card systems to assign key cards to hotel rooms to enable customers to open hotel rooms using key cards instead of using keys. Once the customer has checked out of the room, the key card can be reassigned to another room. Furthermore, financial institutions use card systems to generate bank cards, credit cards, and other cards to enable customers to interact with their accounts. Some card systems include the ability to create temporary cards that are valid only under specific conditions (e.g., for a given period of time). Card providers may use card printers at their premises to create the required cards. Card printers generally process new cards. The processing of the new card may include printing on a surface of the card. Thus, to acquire a temporary card, a customer is generally required to contact the card provider, and the card provider may issue a temporary/new card to the customer in the same manner as a regular card is issued. In many situations, the customer must go through various people and wait for a prolonged period of time (e.g., 7-10 days) before the card is received and maybe used. This may not be acceptable to the customer and the customer may use other means to perform the task that the card performs.

SUMMARY

In some embodiments, to solve this problem, methods, apparatuses, and/or a self-service card dispenser system are disclosed herein that enable a card dispenser to communicate with a device of a user to dispense a card associated with an account of the user. That is, upon request, based on the data received from the device of the user, a card dispenser generates and dispenses, to the user, a card associated with the user's user account.

In some embodiments, the card dispenser may detect a device of a user (e.g., via a short-range wireless connection) and receive, from that device, card data for printing information onto a card received in the card dispenser. The device of the user may have an installed application that interfaces with the systems of the card provider. The application may store account information associated with the account of the user corresponding to the card provider. For example, if a card provider is a hotel, the application may be interfacing with the hotel's computer systems (e.g., servers) that store user account information. Thus, the application may request and/or store account information associated with the particular user.

A user may insert a card into a device associated with the card dispenser (e.g., a user may reuse a card in the user's possession), or the card may be inserted into the card dispenser by a device coupled with the card dispenser (e.g., a new card may be dispensed to the user). The user may select an option within the application for generating a new or temporary card. For example, the user may want to generate a temporary credit card for credit card transactions or a hotel card for being able to enter the hotel and open a hotel door. When the device of the user receives the selection, appropriate card data may be received at the user device from, for example, the server(s) of the card provider. When the card data is received at the device of the user, the card data may be transmitted to the card dispenser. The card data (e.g., received from the device of the user) may include (i) a card identifier associated with an account of a user and (ii) an encryption key for encrypting the card identifier. As an example, the encryption key may be a unique derivation key for encrypting the card identifier, where the key is derived from a unique master key (e.g., associated with the user account). Furthermore, the card data may include a plurality of card identifiers associated with the account of the user. Each identifier may be received along with a unique derivation key for encrypting the card identifier.

The card dispenser may power an electrophoretic display of the card, overwrite the card data on a memory of the card, and cause at least a portion of the card data to be rendered on the display of the card. The card dispenser may stop the powering of the display, subsequent to which, rendering of the portion of the card data remains on the display of the card. At this point, the card may be dispensed to the user. Thus, the card dispenser performing these actions may be a part of a self-service process where a user may receive a card (e.g., a temporary card or a new card).

In some embodiments, the card dispenser may include a card feeder for receiving or dispensing the card; a roller assembly for moving the card from the card feeder to one or more components within the card dispenser and back to the card feeder; and a card writer for overwriting the memory of the card with the card data.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
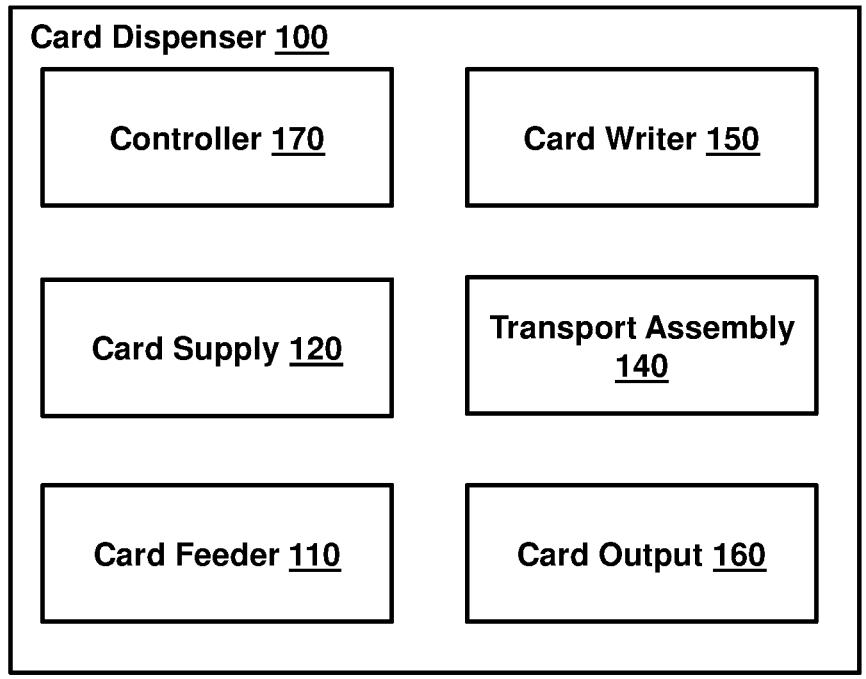
FIG. 1 shows an example of card dispenser for dispensing a card, in accordance with one or more embodiments.
Figure 1:
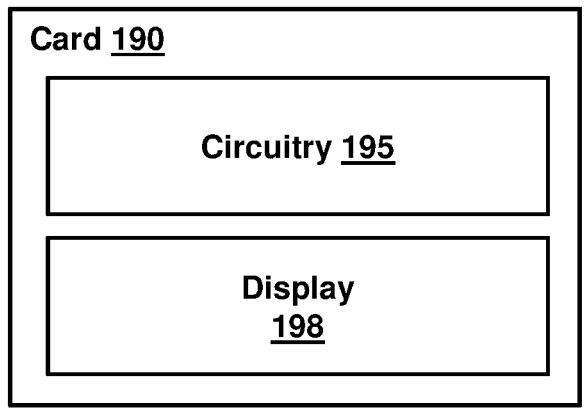

FIG. 1 shows an example of a card dispenser 100, in accordance with one or more embodiments. Card dispenser 100 may be configured to receive a card at an input area, write a card identifier or other card data to the card, and dispense the card after writing the card data to the card. As an example, the card data may include (i) one or more card identifiers associated with a user account (e.g., one or more virtual card numbers associated with the user account), (ii) one or more encryption keys for encrypting one or more pieces of the card data (e.g., unique derivation keys or other keys for encrypting the card identifiers or other data), (iii) one or more card use parameters (e.g., parameters defining one or more restrictions or other features of the card related to usage of the card), or (iv) other data.

As shown in FIG. 1, in some embodiments, card dispenser 100 may include card feeder 110, transport assembly 140, card writer 150, controller 170, or other components. Some or all components of the card dispenser 100 may be operatively coupled and included in an enclosure (not shown). In some embodiments, some or all components of the card dispenser are not collocated (e.g., are not within a same enclosure, or in a same physical location). Card dispenser 100 may be configured to receive a card 190. Card 190 may be moved within components of card dispenser 100, where it is processed and dispensed. As an example, the processing may include communicating with computing components on the card. For example, some cards include microchips that are able to store information including a card number (e.g., an encrypted card number) as well as other identifying information. In addition, the processing may include an authenticating process so that unauthorized car dispenser systems are not able to overwrite data on cards. In some embodiments, the authenticating process may be mutual so that unauthorized cards are not able to gain access to the provider's system. The authenticating process may use public/private key infrastructure (PKI) or another suitable authenticating process.

In some embodiments, the card may include a rewritable memory area for storing data that can be retrieved or otherwise read. For example, the card may include an electrophoretic display that will hold a static image, even without electricity—when there is no change in image or text, the electrophoretic display presents the last content uploaded and will hold it in perpetuity. The electrophoretic display may consume power only when the content on it is changing. Thus, the electrophoretic display is extremely energy efficient and may be capable of running for months on a single battery charge. The card dispenser may store card data on the card and render a portion of the card data on the electrophoretic display of the card.

In some embodiments, card 190 may include circuitry 195, a display 198, or other components. Circuitry 195 may provide information processing and communications capabilities within card 190, or between card 190 and card dispenser 100 or other systems (e.g., server system 250, or point-of-sale terminal 290 described herein). Card dispenser 100 may be configured to receive card 190 and power circuitry 195. For example, circuitry 195 may be powered by contact with the card dispenser (e.g., electrical connection between the circuitry and card dispenser). In another example, circuitry 195 may be wirelessly powered without physical contact with the card dispenser (e.g., via antennas of circuitry 195 and radio frequency signals from card dispenser 100, powering via inductive coupling, etc.).

Circuitry 195 may include a processor, a memory, or other components. For example, card data received by card dispenser 100 may be stored in the memory of circuitry 195, and a portion of the card data may be rendered on display 198. In some embodiments, circuitry 195 may be embedded in card 190. In some embodiments, circuitry 195 may include a microchip, a magnetic strip, a barcode, Quick Response (QR) code, an RFID tag, a communication device (e.g., Near Field Communication (NFC) antenna, Bluetooth® device, or WiFi device), or other electronic components.

Card dispenser 100 may communicate with circuitry 195 to authenticate the card or the user. As an example, after receiving the card, card dispenser 100 may request authentication of the card before processing the card (e.g., storing information, rendering information, etc.). In some embodiments, circuitry 195 may generate a cryptogram from security data previously encoded in circuitry 195 (e.g., by the card issuer), and send the cryptogram along with a digital certificate (from the issuer) to the card dispenser for verification of authenticity of the card by the card dispenser.

Card dispenser 100 may be configured to authenticate the user in various ways. For example, card dispenser 100 may use multi-factor authentication, PKI, or another suitable authentication method. In some embodiments, card dispenser may authenticate the card or the user using proximity of a user device (e.g., a mobile phone). That said, other methods of authenticating the card by the card dispenser 100, or the user are contemplated within the scope of the present disclosure.

Circuitry 195 may be configured to store card data received by card dispenser 100. In some embodiments, card dispenser 100 may read previous information that was previously stored on circuitry 195 (e.g., in the case of a card that is being re-used) before storing the card data. For example, card dispenser 100 may be configured to overwrite the previous information, keep all the previous information and add the card data, or keep some of the previous information and add the card data. Furthermore, card dispenser 100 may be configured to determine what information to keep and what information to overwrite (e.g., by comparing the previous information and the card data). For example, the previous information may include generic information about the card issuer, contact information, instructions for basic function of circuitry 195, or other generic information, that the card dispenser may determine not to overwrite.

In some embodiments, card data received by card dispenser 100 and stored on circuitry 195 may include a card identifier associated with an account of the user. The card identifier may be used to authenticate the card (e.g., after it is dispensed by the card dispenser 100). The card data may include a unique derivation key for encrypting the card identifier. For example, the unique derivation key may be derived from a unique master key (e.g., of the issuer, associated with the user account, etc.). Furthermore, the card data may include a plurality of card identifiers associated with the account of the user. Each identifier may be received along with a unique derivation key for encrypting each card identifier. In addition, card data stored in circuitry 195 may include other security information that may allow the card to be securely used after its dispensed from card dispenser 100. For example, card data may include applications, programs, requirements, or instructions from the card issuer for generating session keys and cryptograms that are unique to the card 190 to be used during transactions (e.g., for authentication or authorization of transactions with the card issuer).

In some embodiments, card data received by card dispenser 100 and stored on circuitry 195 may include one or more card use parameters that define usage of the card after the card dispensed by card dispenser 100. In addition, the card use parameters may be determined by the user, the card issuer, or the card dispenser. Furthermore, the card data may include a plurality of card identifiers that are each associated with a use parameter. For example, the use parameter may define one or more time periods during which use of the card is permitted or prohibited, locations at which use of the card is permitted or prohibited, services or users for or by which use of the card is permitted or prohibited, or other restrictions or use parameters for using the card. In some embodiments, the card use parameters may be defined by the user (e.g., using a user device). As an example, the card use parameters may be defined by an application residing on the user device. For example, when the application on the user device receives a request for dispensing a new card, the application may transmit a request to a card provider (e.g., to one or more servers at the card provider) for data for generating new/temporary card. The user device may receive the card data along with the card use parameters.

In some embodiments, the card use parameters stored in circuitry 195 may include an expiration date, a location (e.g., a specific building, floor, garage, office, lab, etc.), a geographic area (e.g., a specific city, state, country, etc.), a type of business where the card is valid, or other use parameters. The use parameter(s) may be determined by the user (e.g., via a user interface of the user device or the user interface of the card dispenser), by the issuing entity, or another entity. For example, the issuing entity may be a government entity, an employer, a business, a financial institution, or another suitable issuing entity. The cards dispensed by card dispenser 100 may be used for different purposes. For example, the cards may be ID cards, transactional cards, credit cards, bank cards, phone cards, passports, driver's licenses, network access cards, employee badges, security cards, visas, immigration documentation, citizenship cards, social security cards, security badges, gift cards, or other types of cards.

In some embodiments, a portion of the card data received by card dispenser 100 and stored in circuitry 195 may be rendered on the card. For example, a portion of the data may be rendered on display 198, and another portion may be rendered on the surface of the card in a different manner (e.g., printed on the card). In some embodiments, the card dispenser 100 may determine the portion to be rendered on the display based on the type of display, size of the display, or other features of the display. Card dispenser 100 may receive instructions indicating which portion of the card data should be rendered on the display (e.g., from server system 250 or from the user).

In some embodiments, card dispenser 100 may be configured to overwrite previous display information, keep all the previous display information and add a portion of the card data, or keep some of the previous display information and add a portion of the card data. Card dispenser 100 may be configured to determine which information to keep and which information to overwrite (e.g., by comparing the previous display information and the card data). For example, the previous display information may include generic information about the card issuer, contact information, card holder, or other generic information, that the card dispenser may determine to keep.

In one example, card dispenser 100 may be configured to power display 198, render the portion of the card data on the display, and power the display off such that the portion of the data remains on the display after the power is turned off. For example, display 198 may be an electrophoretic display configured to display the portion of the data without requiring power. In some embodiments, the portion of the card data may remain on the display until it is overwritten (e.g., by card dispenser 100).

In another example, card dispenser 100 may be configured to power display 198, render a portion of the card data on the display, and power the display off such that the portion of the data does not remain on the display after the power is turned off. In some embodiments, the data is presented back on the display responsive to the circuit 195/display 198 being powered on. For example, circuit 195 may be turned on responsive to the card being in proximity of a user's device, point-of-sale terminal 290, or the card dispenser 100 (e.g., using radio frequency). The card may be then authenticated (e.g., via multiple-factor authentication), after which the display is turned on and the data is presented on the display.

In some embodiments, card dispenser 100 may be configured to render data on the surface of the card. For example, a portion of the card data may be printed on one or more outer surfaces of the card. This action may be performed using one or more card printing techniques, including thermal transfer using color ribbons, dye diffusion thermal transfer, laser printing, ink jet, reverse image transfer techniques, stamping, embossing, water mark techniques, or other printing (or writing) techniques. In some embodiments, card dispenser 100 may determine an appropriate technology for different types of data to be printed. Furthermore, card dispenser 100 may be configured to overwrite or erase some or all previously printed information. Card dispenser 100 may also be configured to determine which printed information to keep and which information to overwrite (e.g., by comparing the previously printed information and the card data).

In some embodiments, card dispenser may include card feeder 110 for receiving the card and feeding the card into card dispenser 100. Card feeder 110 may be operatively connected to transport assembly 140 for transporting cards within card dispenser 100. Card feeder 110 may be configured to dispense the card. For example, after processing by card dispenser 100, a card may be transported back to card feeder 110 for dispensing. In some embodiments, card feeder 110 may be configured for reading information from the card (e.g., via a card reader in the card feeder 110). Furthermore, card feeder 110 may be configured to power circuitry 195 of the card (e.g., by electrical connection between the circuitry and card dispenser, or via antennas of circuitry 195 and radio frequency signals from card feeder 110). In some embodiments, card feeder 110 may communicate with circuitry 195 to authenticate the card or the user. As an example, after receiving the card, card feeder 110 may request authentication of the card before processing the card (e.g., storing information, rendering information, etc.). In response to the authentication request, circuitry 195 may generate a cryptogram from security data previously encoded in circuitry 195 (e.g., by the card issuer), and send the cryptogram along with a digital certificate (from the issuer) to card feeder 110 for verification of authenticity of the card by the card feeder 110. In addition, card dispenser 100 may be configured to authenticate the card or the user (e.g., via multi-factor authentication, proximity of a user device, etc.).

In some embodiments, the card feeder 110 may be in the form of a card slot, a card tray, or another card receptacle for receiving a card and providing the card to the card dispenser 100 for further processing. Card dispenser 100 may include a card supply storage 120 for storing and supplying one or more cards to be processed by card dispenser 100. In some embodiments, card supply storage 120 may be operatively connected to card feeder 110 or to transport assembly 140 for transporting cards within card dispenser 100. In addition, card supply storage 120 may store "blank" cards that have not been used before or have generic or no data on them. For example, responsive to a request for a new card in instances where a card is not provided through card feeder 110, a card is supplied from card supply storage 120. In some embodiments, card supply storage 120 may be in the form of a tray, a cassette, a receptacle, or another type of card storage for holding cards. Card supply storage 120 may include a card pusher, a loaded spring, clamps, suction cups, or other mechanisms for moving a card from card supply storage 120 to transport assembly 140.

In some embodiments, transport assembly 140 may be configured to move card 190 from card feeder 110 or card supply storage 120 to one or more components within card dispenser 100. The transport assembly 140 may be configured to move the card back to card feeder 110 (e.g., after processing by card dispenser 100). Transport assembly 140 may be operatively connected to one or more components of card dispenser 100 (e.g., card feeder 110, card supply storage 120, card writer 150, card output 160, controller 170, or other components). In some embodiments, transport assembly 140 may include a roller assembly, moving receptacles, belts, pulleys, or other transport mechanisms for moving the card within the card dispenser 100.

Card writer 150 may be configured to receive a card from card feeder 110 or card supply storage 120 via transport assembly 140 and store or render card data (received by card dispenser 100). For example, card writer 150 may be configured to receive card data to be written on the card. Card writer 150 may receive the card data in a variety of ways. For example, card data may be received from server system 250 (shown in FIG. 2 and described herein). In another example, card data may be received via a user device of the user (e.g., mobile device). In yet another example, card data may be received from the user device using radio frequency, Near Field Communication (NFC), Bluetooth®, WiFi, or other contactless manner. In some embodiments, card data may be received by controller 170 and transmitted to card writer 150.

Card writer 150 may be configured to receive card 190 and power circuitry 195. In some embodiments, card writer 150 may power circuitry 195 by contact with the card (e.g., electrical connection between the circuitry 195 and card writer 150). While in some embodiments, card writer 150 may power circuitry 195 without physical contact with the circuitry (e.g., radio frequency signals from card writer 150 and antennas of circuitry 195). Card writer 150 may be configured to store information (card data) in card circuitry 195 in a logical manner. For example, on a microchip, a magnetic strip, a barcode, Quick Response (QR) code, an RFID tag, or another component or components of circuitry 195 of the card. In some embodiments, card writer 150 may use different techniques to write (store) data in circuitry 195 of the card. For example, in some cases, card writer 150 may include a conductive plate for transferring information to and from circuitry 195. In some embodiments, the card writer 150 may be configured to transfer information in a contactless manner (e.g., by using radio frequency, Near Field Communication (NFC), Bluetooth®, WiFi, or other contactless manner). Furthermore, card writer 150 may be configured to encode information onto a magnetic stripe of the card (e.g., by modifying magnetism of iron-based magnetic particles). That said, other techniques for transferring data from card writer to the card circuitry are contemplated within the scope of the disclosure.

In some embodiments, card writer 150 may communicate with circuitry 195 to authenticate the card 190 or the user. As an example, after receiving the card, card writer 150 may request authentication of the card before transferring or rendering data. For example, card writer 150 may read previous information that was previously stored in circuitry 195 (e.g., in the case of a card that is being re-used) before storing the card data, and may overwrite the previous information, keep all the previous information and add the card data, or keep some of the previous information and add the card data. In some embodiments, card writer 150 may be configured to determine which information to keep and which information to overwrite (e.g., by comparing the previous information and the card data). For example, the previous information may include generic information about the card issuer, contact information, instructions for basic function of circuitry 195, or other generic information, that card writer may determine to keep, while determining to overwrite previous account information (e.g., because the previous account information is associated with a previous user).

In some embodiments, card writer 150 may be configured to store (e.g., in circuitry 195 of card 190) card data that includes a card identifier associated with an account of the user, a unique derivation key for encrypting the card identifier, applications, programs, requirements, or instructions from the card issuer for generating session keys and cryptograms that are unique to card 190 (e.g., for authentication or authorization of transactions with the card issuer). Furthermore, card writer 150 may be configured to store one or more card use parameters on the card (e.g., parameters that define usage of the card after the card is dispensed by card dispenser 100). In some embodiments, card writer 150 may be configured to store the card use parameters that define time, location, services, users, restrictions, or other parameters for using the card. For example, the card use parameters may include an expiration date, a location (e.g., a specific building, floor, garage, office, lab, etc.), a geographic area (e.g., a specific city, state, country, etc.), a type of business where the plastic is valid, or other use parameter.

In some embodiments, card writer 150 may be configured to cause a portion of the card data received by card dispenser 100 and stored in circuitry 195 to be rendered on the card 190. For example, card writer 150 may be configured to program the card 190 so that the card 190 is programmed to render a portion of the data on display 198. Additionally or alternatively, card writer 150 may render the portion of the data on another portion on the surface of the card in a different manner (e.g., printed on the card 190). In some embodiments, card writer 150 may determine the portion of data to be rendered on the display based on the type of display, size of the display, or other features of the display. For example, card writer 150 may receive instructions indicating which portion of the card data is to be rendered on the display (e.g., from server system 250 or from the user). In some embodiments, card writer 150 may be configured to overwrite previous display information, keep all the previous display information and add a portion of the card data, or keep some of the previous display information and add a portion of the card data. Card writer 150 may be configured to determine which information to keep and which information to overwrite (e.g., by comparing the previous display information and the card data). For example, the previous display information may include generic information about the card issuer, contact information, card holder, or other generic information, that the card writer 150 may determine to keep.

In some embodiments, card writer 150 may be configured to power display 198, render the portion of the card data on the display, and power off the display such that the portion of the data remains on the display after the power is turned off. For example, display 198 may be an electrophoretic display configured to display at least a portion of the card data without requiring power. In some embodiments, the portion of the card data may remain on the display until that data is overwritten (e.g., by card writer 150).

In some embodiments, card writer 150 may be configured to power display 198, render a portion of the card data on the display, and power off the display such that the portion of the data does not remain on the display after the power is turned off. For example, the data may be presented back on the display responsive to circuitry 195/display 198 being powered on. In another example, responsive to the card being in proximity of a user's device, or point-of-sale terminal 290 (or the card dispenser 100), circuitry 195 may be turned on (e.g., using radio frequency). The card may then be authenticated (e.g., via multifactor authentication), after which the display may be turned on and the data presented on the display.

In some embodiments, card writer 150 may be configured to render data on the surface of the card. For example, card writer 150 may be configured to print a portion of the card on one or more outer surfaces of the card. Card writer 150 may use one or more card printing techniques including thermal transfer using color ribbons, dye diffusion thermal transfer, laser printing, ink jet, reverse image transfer techniques, stamping, embossing, water mark techniques, or other printing (or writing) techniques. In some embodiments, card writer 150 may determine an appropriate technology for various data to be printed (e.g., thermal printing issuer's name, contact info, Card Verification Value (CVV), etc.; embossing user's name, expiration date, etc.; or stamping a water mark). In some embodiments, card writer 150 may be configured to overwrite or erase some or all previously printed information. Card writer 150 may be configured to determine which printed information to keep and which information to overwrite (e.g., by comparing the previously printed information and the card data).

In some embodiments, card output 160 may be configured to dispense card 190. Card output 160 may be operatively connected to transport assembly 140, card writer 150, card feeder 110, controller 170, or other components of card dispenser 100. In some embodiments, card output 160 may be configured to receive card 190 after being processed by card writer 150. For example, card output 160 may be configured to read card data on the card before dispensing the card. In some embodiments, card output 160 may be configured to power the card 190, read the card data from the card 190, compare the data on the card 190 with the card data received by card dispenser 100 (to be written on the card 190), and dispense the card 190 responsive to the data on the card 190 matching the card data. In some embodiments, responsive to the data not matching, card output 160 may be configured to return the card 190 to card writer 150 (e.g., for rewriting) or for discarding the card 190. Card output 160 may be in the form of a slot, a tray, a tube, or receptacle for dispensing the card. In some embodiments, some or all operations performed by card dispenser may be performed by card feeder 110. For example, transport assembly 140 may be configured to transport the card 190 from card writer 150 back to card feeder 110 for dispensing.

It should be appreciated that the description of the functionality provided by the different components of card dispenser 100 described herein is for illustrative purposes, and is not intended to be limiting, as any of components of card dispenser 100 may provide more or less functionality than described. For example, one or more of components 110, 120, 140, 150, or 160 may be eliminated, and some or all of their functionality may be provided by other ones of the components of card dispenser 100. As another example, additional subsystems may be configured to perform some, or all of the functionality attributed herein to one of the components of card dispenser 100.

In some embodiments, controller 170 may be configured to manage one or more operations of card dispenser 100. For example, controller 170 may be configured to transfer information, instructions, or signals to operate components 110, 120, 140, 150, and 160. In some embodiments, controller 170 may be operatively connected to and in communication with components 110, 120, 140, 150, and 160 and may include a processor, memory, storage, I/O device, or other components.

Controller 170 may be configured to provide information-processing capabilities in card dispenser 100 for example, by executing one or more program instructions to perform one or more functions of components 110, 120, 140, 150, and 160. In some embodiments, controller 170 may include one or more of a digital processor, an analog processor, a digital circuit designed to process information, an analog circuit designed to process information, a state machine, or other mechanisms for electronically processing information. In some embodiments, controller 170 may include one or more processing units. The processing units may be physically located within the same device, or controller 170 may represent processing functionality of a plurality of devices operating in coordination. In some embodiments, controller 170 may implement virtual machine technologies, or other known technologies to provide the ability to execute, control, run, manipulate, store, etc. multiple software processes, applications, programs, etc. One of ordinary skill in the art would understand that other types of processor arrangements may be implemented that provide for the capabilities disclosed herein.

In some embodiments, controller 170 may include one or more storage devices configured to store information used to perform certain functions related to the disclosed embodiments. As an example, controller 170 may include memory that includes instructions (or programs) that, when executed, perform one or more processes consistent with the functionalities of components 110, 120, 140, 150, and 160. For example, the memory may include programs/instructions to execute one or more applications, such as card dispenser applications, an electronic transaction application, network communication processes, and any other type of application or software known to be available on computer systems. In some embodiments, controller 170 may execute one or more programs located remotely from controller 170 or card dispenser 100. For example, controller 170 may access one or more remote programs via a communications network similar to network 295 (shown in FIG. 2 and described herein).

Figure 2:
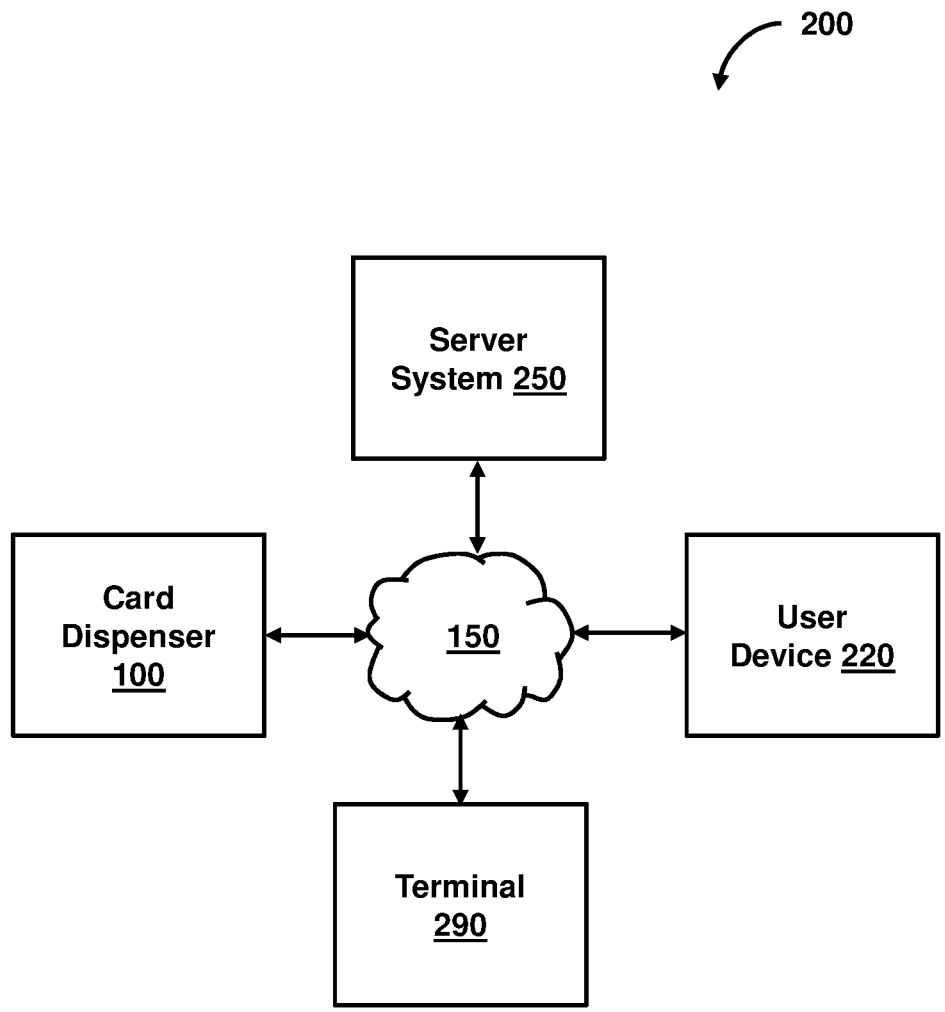
FIG. 2 shows an example of a system including a card dispenser, in accordance with one or more embodiments.

FIG. 2 shows an example of a system 200 that includes card dispenser 100, in accordance with one or more embodiments. In some embodiments, system 200 may include a user device 220 associated with a user, point-of-sale terminal 290 with which the user may enter into a transaction using card 190 or user device 220, server system 250, or other components. In some embodiments, system 200 may also include a network 295 to facilitate communication between the components of system 200.

In some embodiments, user device 220 may be configured to communicate with server system 250 and perform one or more aspects of the disclosed operations. User device 220 may also be used for authenticating, the user, card 190, or operations performed by one or more components of system 200 (e.g., card dispenser 100, point-of-sale terminal 290, etc.). In some embodiments, user device 220 may be configured for multi-factor authentication, proximity authentication, or other forms of authentication. For example, user device 220 may include an authentication program (or application) configured authenticate the user, the card, or a transaction. In some embodiments, user device 220 may be configured to control card 190 based on proximity of the card and the user device. For example, by sending authorize/lock/unlock, or other control signals to card 190. User device 220 may authenticate the user/card/transaction using multi-factor authentication via push notifications (e.g., from server system 250, point-of-sale terminal 290, card dispenser 100, or other components.) In some embodiments, user device 220 may be configured to communicate with server system 250 via a user application installed thereon, access to a web page, a messaging system, or other forms of communications. In addition, user device 220 may allow the user to access information stored in server system 250, such as, for example, financial and or account information related to recent purchase transactions, financial statements, account information, rewards program information and the like.

In some embodiments, the user may operate user device 220 to control one or more operations of card dispenser 100. For example, user device 220 may be used to authenticate the identity of the user before the start of the operations of card dispenser 100 (via communication with server system 250). For example, user device 220 may be used to receive a request for a card (e.g., from user), define card use parameters of the card (e.g., via user input), provide card data to card dispenser 100 (e.g., received from server system 250), authorize printing of the card (after verification and authentication with server system 250), or perform other operations of card dispenser 100.

In some embodiments, the user device 220 may be one or more of desktop computers, laptop computers, handheld computers, NetBooks, tablets, Smartphones, Smartwatches, PDAs, cellular telephones, PC's or any suitable device with computing capability. User device 220 may include one or more processor(s) and memory device(s) known to those skilled in the art. For example, user device may include memory device(s) that store data and software instructions that, when executed by one or more processor(s), perform operations consistent with one or more of the disclosed embodiments. In some embodiments, user device may have an application installed thereon, which may enable user device 220 to communicate with Server system 250 via network 295. For instance, user device may be a smartphone or tablet or the like that executes a stored mobile application that performs online financial operations. In other embodiments, user device may connect to server system 250 through use of browser software stored and executed by user device.

Point-of-sale terminal 290 may be any suitable device for communicating with a merchant computer or payment processing network, and for interacting with a payment device, a user computer apparatus, or a user mobile device. An access device may generally be located in any suitable location, such as at the location of a merchant. point-of-sale terminal 290 may be in any suitable form. Some examples of point-of-sale terminal 290 as used herein may include cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. point-of-sale terminal 290 may use any suitable contact or contactless mode of operation to send or receive data from, or associated with, a portable communication device. In some embodiments, point-of-sale terminal 290 may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

In some embodiments, server system 250 may be configured to perform one or more operations related to the user account. For example, server system 250 may be configured to manage the user account. In addition, server system 250 may be configured to authorize one or more operations of card dispenser 100. In some embodiments, server system 250 may receive a request (e.g., from user via the user device) for printing a card associated with the user account and authenticate the user (e.g., via a multi-factor authentication). In some embodiments, server system 250 may be configured to generate a card identifier associated with the user account. The card identifier may be a card number (e.g., to be rendered on the card). In some embodiments, the card identifier is randomly generated such that the card identifier is different from the account number, or different from previously generated identifiers associated with the account. In some embodiments, the card identifier may be chosen from a database of unique identifiers.

In some embodiments, server system 250 may be configured to generate a unique derivation key for encrypting the card identifier. For example, the card identifier encrypted using the unique derivation key may be used by the card during communications with server system 250 (or point-of-sale terminal 290, card dispenser 100, or other systems). In some embodiments, the unique derivation key is derived from a master key of the server system 250. In some embodiments, the card may be configured to generate a dynamic cryptogram (for a one-time use) using the derivation key (e.g., for each interaction with point-of-sale terminal 290). For example, server system 250 provide may provide to the card dispenser other digital certificates, that along with the static cryptogram, and the card's generated cryptogram may be used for encrypting communications between the card, point-of-sale terminal 290, or the server system 250.

In some embodiments, server system 250 may determine one or more card use parameters associated with the card. For example, the card use parameters may define time, location, services, users, restrictions, or other parameters for using the card. For example, one or more use parameter determined by server system 250 may include an expiration date, a location (e.g., a specific building, floor, garage, office, lab, etc.), a geographic area (e.g., a specific city, state, country, etc.), a type of business where the plastic is valid, or other use parameters.

In some embodiments, server system 250 may include one or more computing systems that are configured to execute software instructions stored on one or more memory devices to perform operations consistent with the disclosed embodiments. For example, server system 250 may include one or more memory device(s) storing data and software instructions and one or more processor(s) configured to use the data and execute the software instructions to perform server-based functions and operations known to those skilled in the art.

The following is an example of operations of system 200. In this example, the card is a transaction card, and the card issuer is a financial institution. In some embodiments, a user may operate a user device 220 to print a plastic transaction card using card dispenser 100. In some embodiments, card dispenser 100 may be integrated with ATMs, placed at bank branches, or be a stand-alone dispenser. In some embodiments, the financial institution's server system 250 may generate a virtual card number (that may be referred to as a card identifier) that is linked to the user account. For example, the virtual card number may be linked to a transaction card of the user (e.g., credit or debit card). In some embodiments, card dispenser 100 may be configured to render the virtual card number on the transaction card (e.g., on a card display).

In some embodiments, server system 250 may provide to the card dispenser card data for the transaction card. For example, the card data may include a name, a cvv number, or expiration date. In addition, user device 220 (e.g., via an online dashboard) may allow the user to monitor, or control card spend activity on the account the card number is linked to. In some embodiments, the user may define one or more use parameters for the transaction card for example by customizing the card for one or more authorized users, categories, merchants, locations, and spend limits (e.g., overall spend limit, spend limit per category, spend limit per location, spend limit per merchant, etc.). This may provide a seamless integration with account holder financial institutions systems. Changes made to the transaction card may take effect immediately thereby reducing the wait time and the need for service support to link new cards to the user account. The transaction card may help mitigate fraud on lost or stolen credit cards by revealing a virtual number, cvv and expiration date on the physical transaction card in place of the customer's real credit card credentials.

Network 295 may comprise any type of computer networking arrangement used to exchange data. For example, network 295 may include the Internet, a private data network, a virtual private network using a public network, a Wi-Fi network, a LAN or WAN network, or other suitable connections that may enable information exchange among various components of the system 200. Network 295 may also include a public switched telephone network ("PSTN") or a wireless cellular network. In other embodiments, one or more components of system 200 may communicate directly through a dedicated communication link(s), such as links between user device 220, card dispenser 100, server system 250, terminal 290, and or other components of the system.

In some embodiments, network 295 may include a direct communication network. Direct communications may use any suitable technologies, including, for example, BLUETOOTH™, BLUETOOTH LE™ (BLE), Wi-Fi, near field communications (NFC), or other suitable communication methods that provide a medium for transmitting data between separate devices. In certain embodiments, user device 220, card dispenser 100, server system 250, terminal 290, and or other components may connect and communicate through a direct communications network.

Example Flowchart(s)

The example flowchart(s) described herein of processing operations of methods that enable the various features and functionality of the system as described in detail above. The processing operations of each method presented below are intended to be illustrative and non-limiting. In some embodiments, for example, the methods may be accomplished with one or more additional operations not described, or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, or other mechanisms for electronically processing information). The processing devices may include one or more devices executing some or all of the operations of the methods in response to instructions stored electronically on an electronic storage medium. The processing devices may include one or more devices configured through hardware, firmware, or software to be specifically designed for execution of one or more of the operations of the methods.

Figure 3:
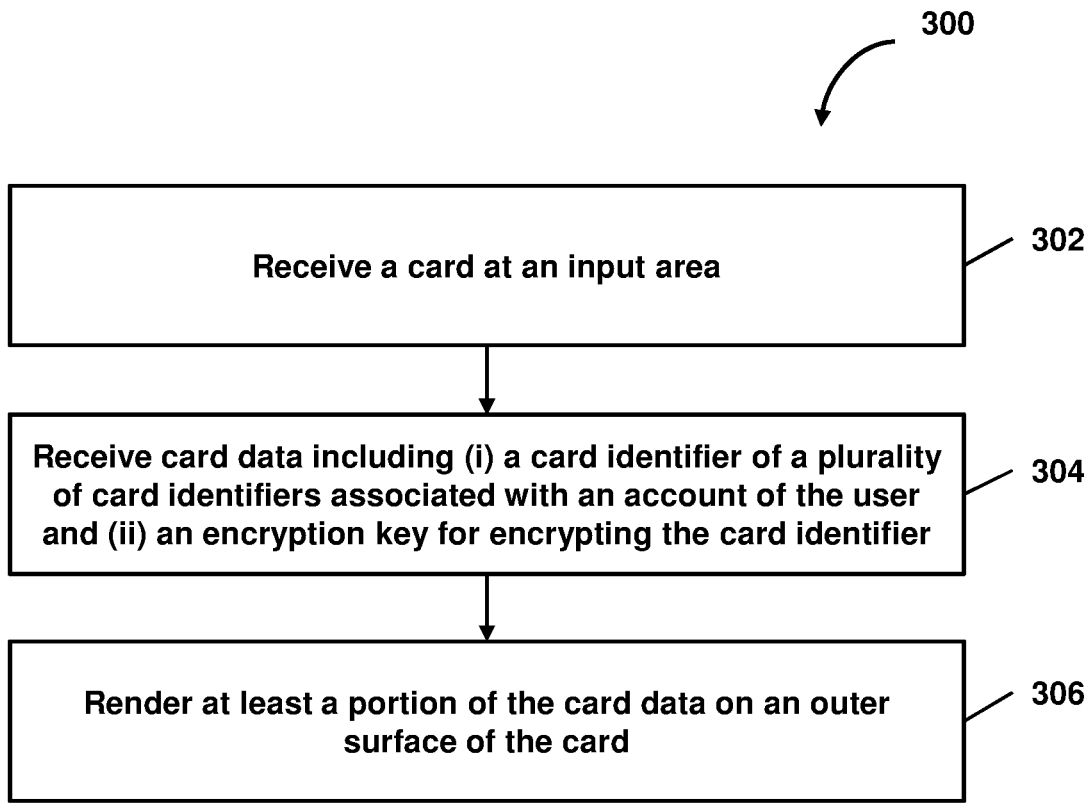
FIGS. 3-5 show flowcharts of methods of dispensing a card, in accordance with various embodiments.

FIG. 3 shows a flowchart of a method 300 of dispensing a card in accordance with one or more embodiments. At operation 302, a card (e.g., a rewritable card or other card) may be received at an input area of a card dispenser. As an example, the input area may include a card feeder or other component with an opening (or other portion) to receive the card or to receive and dispense the card. Operation 302 may be performed by a component that is the same as or similar to card feeder 110, in accordance with one or more embodiments.

At operation 304, card data for the card may be received. As an example, the card data may include a card identifier of a plurality of card identifiers associated with an account of the user, an encryption key for encrypting the card identifier, or other data. As a further example, the card data may include card use parameters defining one or more restrictions or other features of the card related to usage of the card. Operation 304 may be performed by a component that is the same as or similar to card writer 150, in accordance with one or more embodiments.

In some embodiments, the card data may be received via a short-range wireless connection with a user device (e.g., from an application on the user device). As an example, proximity of the user device of the user may be detected, and the short-range wireless connection may be established between the card dispenser and the user device. The card dispenser may transmit a request for the card data to the user device via the short-range wireless connection and, in response, receive the card data from the user device via the short-range wireless connection.

At operation 306, at least a portion of the card data may be rendered on an outer surface of the card. As an example, the card identifier (or other portion of the card data) may be rendered using one or more card printing techniques, including thermal transfer using color ribbons, dye diffusion thermal transfer, laser printing, ink jet, reverse image transfer techniques, stamping, embossing, water mark techniques, or other printing (or writing) techniques. Operation 306 may be performed by a component that is the same as or similar to card writer 150, in accordance with one or more embodiments.

Figure 4:
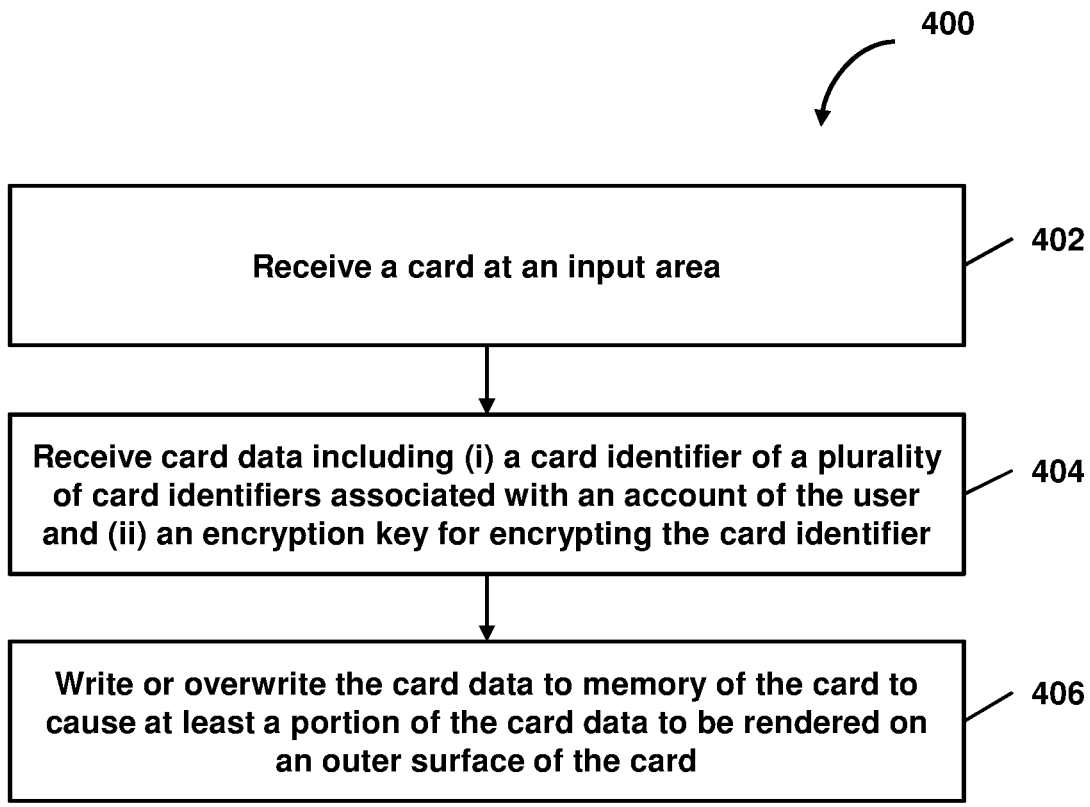

FIG. 4 shows a flowchart of a method 400 of dispensing a card in accordance with one or more embodiments. At operation 402, a card (e.g., a rewritable card or other card) may be received at an input area of a card dispenser. As an example, the input area may include a card feeder or other component with an opening (or other portion) to receive the card or to receive and dispense the card. Operation 402 may be performed by a component that is the same as or similar to card feeder 110, in accordance with one or more embodiments.

At operation 404, card data for the card may be received. As indicated above, the card data may include a card identifier of a plurality of card identifiers associated with an account of the user, an encryption key for encrypting the card identifier, one or more card use parameters, or other data. As an example, the card data may be received via a short-range wireless connection with a user device of the user (e.g., from an application on the user device). Operation 404 may be performed by a component that is the same as or similar to card writer 150, in accordance with one or more embodiments.

At operation 406, the card data may be written or overwritten to memory of the card, which will cause at least a portion of the card data to be rendered on an outer surface of the card. As an example, the card may be programmed with one or more instructions to present the card data portion that is written to a predefined memory location or data field of the card. As such, by writing the card data portion to the predefined memory location or data field, the card data portion is rendered on a display of the card (e.g., an electrophoretic display or other low power display). Operation 406 may be performed by a component that is the same as or similar to card writer 150, in accordance with one or more embodiments.

In some embodiments, the card dispenser may power the card to enable writing to the memory of the card. As an example, the card may be a passive card, and, upon being powered, the card may begin communicating with the card dispenser via RFID, NFC, or other wireless techniques. In some embodiments, where the card comprises a display, the powering of the card by the card dispenser may include powering of the display of the card to cause at least a portion of the card data written to the memory of the card (e.g., stored at a predefined memory location or data field of the card) to be rendered on the display (e.g., an electrophoretic display or other low power display).

Figure 5:
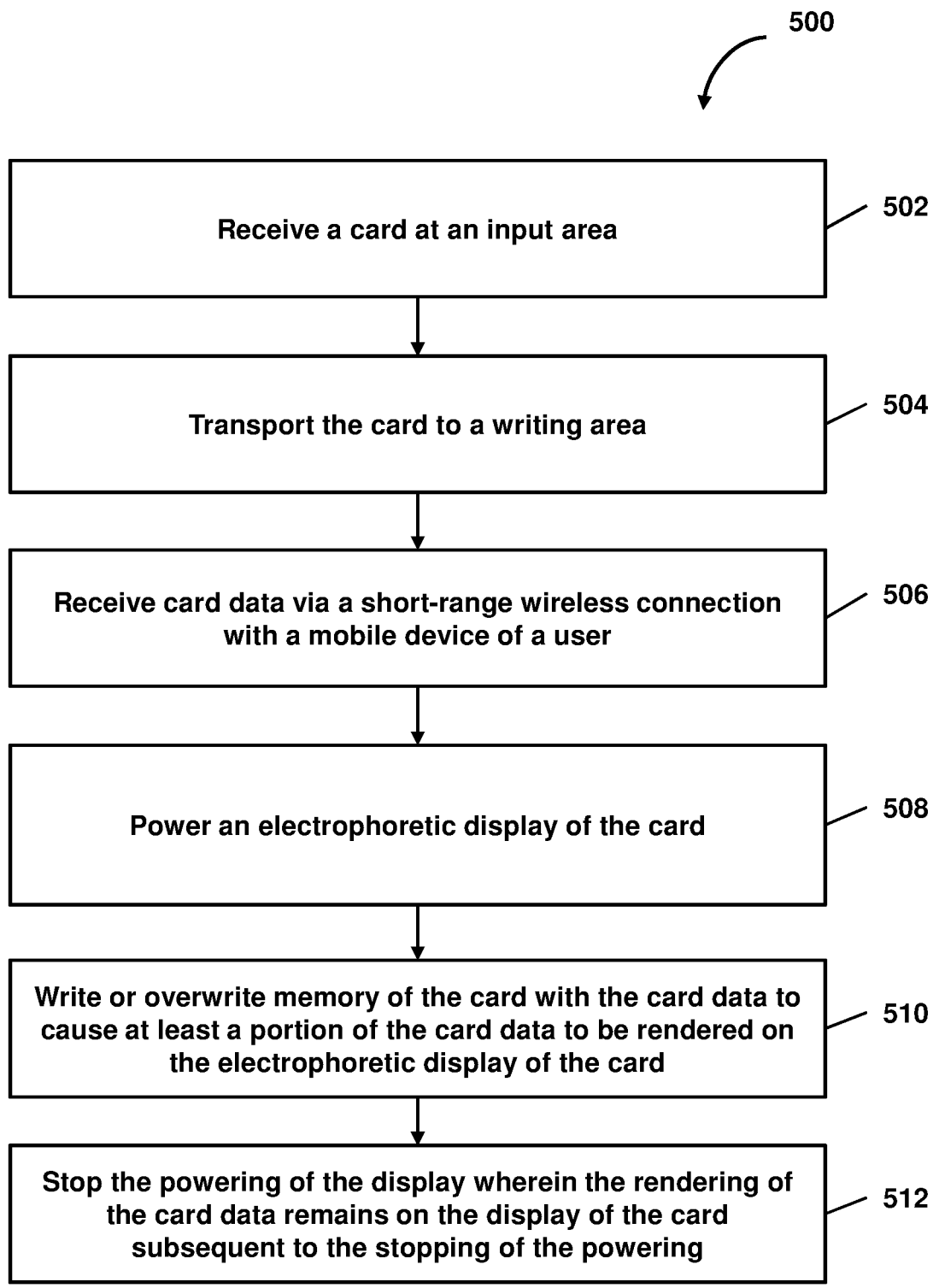

FIG. 5 shows a flowchart of a method 500 of dispensing a card in accordance with one or more embodiments. At operation 502, a card (e.g., a rewritable card or other card) may be received at an input area of a card dispenser. As an example, the input area may include a card feeder or other component with an opening (or other portion) to receive the card or to receive and dispense the card. Operation 502 may be performed by a component that is the same as or similar to card feeder 110, in accordance with one or more embodiments.

At operation 504, the card is transported to a writing area of the card dispenser. Operation 504 may be performed by a component that is the same as or similar to transport assembly 140, in accordance with one or more embodiments.

At operation 506, card data for the card may be received via a short-range wireless connection with a mobile device of a user (e.g., from a mobile application on the mobile device). As indicated above, the card data may include a card identifier of a plurality of card identifiers associated with an account of the user, an encryption key for encrypting the card identifier, one or more card use parameters, or other data. As an example, proximity of the mobile device of the user may be detected, and the short-range wireless connection may be established between the card dispenser and the mobile device. The card dispenser may transmit a request for the card data to the mobile device via the short-range wireless connection and, in response, receive the card data from the mobile device via the short-range wireless connection.

At operation 508, an electrophoretic display of the card may be powered. As an example, the electrophoretic display may be wirelessly powered via one or more wireless power transfer techniques (e.g., via inductive coupling or other techniques). Operation 508 may be performed by a component that is the same as or similar to card writer 150, in accordance with one or more embodiments.

At operation 510, a memory of the card may be written or overwritten with the card data to cause at least a portion of the card data to be rendered on the electrophoretic display of the card. As an example, the card may be programmed with one or more instructions to present the card data portion that is written to a predefined memory location or data field of the card. By writing the card data portion to the predefined memory location or data field, the card data portion is rendered on the electrophoretic display. Operation 510 may be performed by a component that is the same as or similar to card writer 150, in accordance with one or more embodiments.

At operation 512, powering of the electrophoretic display of the card may be stopped such that the portion of the card data remains on the electrophoretic display of the card subsequent to the stopping of the powering of the electrophoretic display of the card. Operation 512 may be performed by a component that is the same as or similar to card writer 150, in accordance with one or more embodiments.

In some embodiments, the various devices illustrated in FIGS. 1-2 may include one or more computing devices that are programmed to perform the functions described herein. The computing devices may include one or more electronic storages, one or more physical processors programmed with one or more computer program instructions, or other components. The computing devices may include communication lines or ports to enable the exchange of information within a network (e.g., network 295) or other computing platforms via wired or wireless techniques (e.g., Ethernet, fiber optics, coaxial cable, WiFi, Bluetooth, near field communication, or other technologies). The computing devices may include a plurality of hardware, software, or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), or other electronically readable storage media. The electronic storages may include one or more virtual storage resources (e.g., cloud storage, a virtual private network, or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein. The processors may be programmed to execute computer program instructions by software; hardware; firmware; some combination of software, hardware, or firmware; or other mechanisms for configuring processing capabilities on the processors.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: receiving a card; receiving card data for a user; and rendering at least a portion of the card data on an outer surface of the card.
2. The method of embodiment 1, wherein the card data comprises card identifier of a plurality of card identifiers associated with an account of the user.
3. The method of any of embodiments 1-2, wherein the card data comprises an encryption key for encrypting the card identifier.
4. The method of any of embodiments 1-3, further comprising writing the card data on a memory of the card.
5. The method of any of embodiments 1-3, further comprising overwriting the card data on a memory of the card.
6. The method of any of embodiments 1-5, wherein the card data is received via a short-range wireless connection.
7. The method of any of embodiments 2-6, further comprising rendering the card identifier on the outer surface of the card.
8. The method of any of embodiments 1-7, wherein the card data further comprises card use parameters defining parameters of use of the card.
9. The method of any of embodiments 1-8, wherein the card data comprises a second card identifier different from the card identifier.
10. The method of embodiment 9, wherein the card identifier is associated with a first card use parameter.
11. The method of embodiment 10, wherein the second card identifier is associated with a first card use parameter.
12. The method of any of embodiments 1-11, further comprising powering a display of the card.
13. The method of embodiment 12, further comprising rendering the at least portion of the card data on display of the card.
14. The method of embodiment 13, further comprising stopping the powering of the display of the card, wherein the rendering of the portion of the card data remains on the display of the card subsequent to the stopping of the powering of the display of the card.
15. The method of embodiments 1-14, further comprising: detecting proximity of a user device of the user; establishing, based on the detection, a short-range wireless connection with the user device; and transmitting a request for the card data to the user device via the short-range wireless connection.
16. A tangible, non-transitory, machine-readable media storing instructions that, when executed by an apparatus, cause the apparatus to effectuate operations comprising those of any of embodiments 1-15.
17. A system comprising: one or more processors; and memory storing instructions that, when executed by the processors, cause the processors to effectuate operations comprising those of any of embodiments 1-15.
18. An apparatus that performs the operations of any of embodiments 1-15.
19. A card dispenser for dispensing rewritable cards, the card dispenser comprising: a card feeder configured to receive or dispense a rewritable card, the rewritable card comprising an electrophoretic display; a roller assembly, within the card dispenser, configured to move the card from the card feeder to one or more components within the card dispenser and back to the card feeder; a processor configured to receive card data via a short-range wireless connection with a mobile device of a user, the card data comprising (i) a card identifier of a plurality of card identifiers associated with an account of the user and (ii) a unique derivation key for encrypting the card identifier, the unique derivation key being derived from a unique master key; and a card writer, within the card dispenser, configured to: power the electrophoretic display of the rewritable card; overwrite memory of the rewritable card with the card data to cause at least a portion of the card data to be rendered on the electrophoretic display of the rewritable card; and stop the powering of the electrophoretic display of the rewritable card, wherein the rendering of the portion of the card data remains on the electrophoretic display of the rewritable card subsequent to the stopping of the powering of the electrophoretic display of the rewritable card.
20. The card dispenser of embodiment 19, wherein causing the portion of the card data to be rendered comprises causing the card identifier to be rendered on the electrophoretic display of the card.
21. The card dispenser of any of embodiments 19-20, wherein the processor is configured to: detect proximity of the mobile device of the user; establish, based on the detection, the short-range wireless connection with the mobile device; and transmit a request for the card data to the mobile device.
22. The card dispenser any of embodiments 19-21, wherein the card data comprises card use parameters related to categories and threshold values associated with the categories, the card use parameters comprising a card use parameter associated with the card identifier.

What is claimed is:

1. A card dispenser for dispensing cards customized for authorized users, the card dispenser comprising:

one or more processors configured to:
receive card data from a user device, the card data comprising (i) a card identifier of a plurality of card identifiers associated with an account of a user and (ii) a plurality of user-defined use parameters input by the user into the user device; and
determine a first portion of the card data to render on an electrophoretic display of a card, a second portion of the card data to be written into a memory of the card, and a third portion of the card data to render on a surface of the card, wherein the second portion comprises the plurality of user-defined use parameters; and
a card writer configured to:
apply power to the card; and
while the power is applied to the card, cause the first portion of the card data to be rendered on the electrophoretic display, the second portion of the card data to be written into the memory of the card, and the third portion of the card data to be rendered on the surface of the card, wherein the card writer (1) causes the card identifier to be rendered onto the electrophoretic display of the card and (2) writes the plurality of user-defined use parameters into the memory of the card, and wherein usage of the card is limited to an authorized user according to the plurality of user-defined use parameters.

2. The card dispenser of claim 1, wherein the plurality of user-defined use parameters comprise:
one or more permitted time periods during which using the card is permitted;
one or more prohibited time periods during which using the card is prohibited;
one or more permitted locations at which using the card is permitted;
one or more prohibited locations at which using the card is prohibited;
one or more permitted services for which using the card is permitted; or
one or more prohibited services for which using the card is prohibited.

3. The card dispenser of claim 1, wherein the one or more processors are further configured to:
detect proximity of the user device;
establish, based on detecting the user device of the user, a short-range wireless connection with the user device; and
transmit a request for the card data to the user device.

4. The card dispenser of claim 1, wherein the plurality of user-defined use parameters is received from a client application on the user device, and wherein the plurality of user-defined use parameters is input at a user interface of the user device.

5. The card dispenser of claim 1, wherein the card data comprises card use parameters related to categories and threshold values associated with the categories, the card use parameters comprising a card use parameter associated with the card identifier.

6. The card dispenser of claim 1, wherein the card data comprises a unique derivation key for encrypting the card identifier, the unique derivation key being derived from a unique master key.

7. The card dispenser of claim 1, wherein the card data comprises a second card identifier and a second plurality of user-defined card use parameters, and where the second card identifier and the second plurality of user-defined card use parameters are written to the memory of the card.

8. A method comprising:
receiving card data comprising (i) a card identifier of a plurality of card identifiers associated with an account of a user and (ii) a plurality of user-defined use parameters input by the user into a user device;
determining a portion of the card data to be written into a memory of a card, wherein the portion comprises the plurality of user-defined use parameters, wherein the plurality of user-defined use parameters restrict usage of the card for an authorized user;
applying power to the card; and
while the power is applied to the card, causing the portion of the card data to be written into the memory of the card, and another portion of the card data to be rendered on a surface of the card, wherein a card writer writes the plurality of user-defined use parameters into the memory of the card, and wherein the usage of the card is limited to the authorized user according to the plurality of user-defined use parameters.

9. The method of claim 8, wherein the plurality of user-defined use parameters comprise:
one or more permitted time periods during which using the card is permitted;
one or more prohibited time periods during which using the card is prohibited;
one or more permitted locations at which using the card is permitted;
one or more prohibited locations at which using the card is prohibited;
one or more permitted services for which using the card is permitted; or
one or more prohibited services for which using the card is prohibited.

10. The method of claim 8, further comprising:
detecting proximity of the user device;
establishing, based on detecting the user device of the user, a short-range wireless connection with the user device; and
transmitting a request for the card data to the user device.

11. The method of claim 8, wherein the plurality of user-defined use parameters is received from a client application on the user device, and wherein the plurality of user-defined use parameters is input at a user interface of the user device.

12. The method of claim 8, wherein the card data comprises card use parameters related to categories and threshold values associated with the categories, the card use parameters comprising a card use parameter associated with the card identifier.

13. The method of claim 8, wherein the card data comprises a unique derivation key for encrypting the card identifier, the unique derivation key being derived from a unique master key.

14. The method of claim 8, wherein the card data comprises a second card identifier and a second plurality of user-defined card use parameters, and where the second card identifier and the second plurality of user-defined card use parameters are written to the memory of the card.

15. One or more non-transitory computer readable media comprising instructions that when executed by one or more processors cause the one or more processors to perform operations comprising:
receiving card data comprising (i) a card identifier of a plurality of card identifiers associated with an account of a user and (ii) a plurality of user-defined use parameters input by the user into a user device;

determining a portion of the card data to be written into a memory of a card, wherein the portion comprises the plurality of user-defined use parameters, wherein the plurality of user-defined use parameters restrict usage of the card for an authorized user;

applying power to the card;

while the power is applied to the card, cause the portion of the card data to be written into the memory of the card, and another portion of the card data to be rendered on a surface of the card, wherein a card writer writes the plurality of user-defined use parameters into the memory of the card, and wherein the usage of the card is limited to the authorized user according to the plurality of user-defined use parameters; and stopping application of the power to the card.

16. The one or more non-transitory computer readable media of claim 15, wherein the plurality of user-defined use parameters comprise:

one or more permitted time periods during which using the card is permitted;

one or more prohibited time periods during which using the card is prohibited;

one or more permitted locations at which using the card is permitted;

one or more prohibited locations at which using the card is prohibited;

one or more permitted services for which using the card is permitted; or one or more prohibited services for which using the card is prohibited.

17. The one or more non-transitory computer readable media of claim 15, wherein the instructions further cause the one or more processors to perform operations comprising:

detecting proximity of the user device;

establishing, based on detecting the user device of the user, a short-range wireless connection with the user device; and transmitting a request for the card data to the user device.

18. The one or more non-transitory computer readable media of claim 15, wherein the plurality of user-defined use parameters is received from a client application on the user device, and wherein the plurality of user-defined use parameters is input at a user interface of the user device.

19. The one or more non-transitory computer readable media of claim 15, wherein the card data comprises card use parameters related to categories and threshold values associated with the categories, the card use parameters comprising a card use parameter associated with the card identifier.

20. The one or more non-transitory computer readable media of claim 15, wherein the card data comprises a unique derivation key for encrypting the card identifier, the unique derivation key being derived from a unique master key.

* * * * *